(12) United States Patent
Kuntze-Fechner et al.

(10) Patent No.: US 9,469,399 B2
(45) Date of Patent: Oct. 18, 2016

(54) SEPARABLE BLADE ATTACHMENT FOR A BEARINGLESS ROTOR OF A HELICOPTER

(71) Applicant: AIRBUS HELICOPTERS DEUTSCHLAND GMBH, Donaumorth (DE)

(72) Inventors: Gerald Kuntze-Fechner, Gmund Am Tegernsee (DE); Markus Bauer, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 482 days.

(21) Appl. No.: 14/053,841

(22) Filed: Oct. 15, 2013

(65) Prior Publication Data

US 2014/0112785 A1  Apr. 24, 2014

(30) Foreign Application Priority Data

Oct. 18, 2012 (EP) .................................... 12400042

(51) Int. Cl.
  *B64C 27/33* (2006.01)
  *B64C 27/51* (2006.01)

(52) U.S. Cl.
  CPC ............... *B64C 27/33* (2013.01); *B64C 27/51* (2013.01)

(58) Field of Classification Search
  CPC ....... B64C 27/33; B64C 27/51; B64C 27/50; B64C 27/48; B64C 27/35; F01D 5/30
  See application file for complete search history.

(56) References Cited

U.S. PATENT DOCUMENTS

| | | | | |
|---|---|---|---|---|
| 3,125,164 | A | * | 3/1964 | Merrell ................... B64C 27/50 24/DIG. 52 |
| 3,652,185 | A | * | 3/1972 | Cresap .................... B64C 27/32 416/134 A |
| 3,674,379 | A | * | 7/1972 | Monti ..................... B64C 27/48 416/226 |
| 3,967,918 | A | | 7/1976 | Mouille |
| 4,252,504 | A | * | 2/1981 | Covington .............. B64C 27/50 416/143 |
| 4,268,222 | A | * | 5/1981 | Bernard .................. B64C 27/50 416/1 |
| 4,292,009 | A | * | 9/1981 | Weiland .................. B64C 27/33 416/134 A |

(Continued)

FOREIGN PATENT DOCUMENTS

EP  0315962 A2  5/1989

OTHER PUBLICATIONS

Search Report and Written Opinion; Application No. EP 12400042; Dated Mar. 14, 2013.

*Primary Examiner* — Igor Kershteyn
*Assistant Examiner* — Eldon Brockman
(74) *Attorney, Agent, or Firm* — Brooks Kushman P.C.

(57) ABSTRACT

The invention relates to a separable blade attachment (1) for a bearingless main rotor of a helicopter with an airfoil blade (2), a flexbeam (3) and a control cuff (4) enclosing at least a predominant portion of said flexbeam (3). A separable junction arrangement between said flexbeam head (13), said control cuff (4, 22) and said root end of said airfoil blade (2) is mechanical with removable fasteners. A stiffened link (17) is provided between respective trailing edges (9) of the control cuff (4) and said airfoil blade (2).

11 Claims, 2 Drawing Sheets

(56) References Cited

U.S. PATENT DOCUMENTS

| | | | |
|---|---|---|---|
| 4,427,340 A | 1/1984 | Metzger | |
| 4,432,696 A * | 2/1984 | Stephan | B64C 27/32 416/134 A |
| 4,676,720 A * | 6/1987 | Niwa | B64C 27/51 416/134 A |
| 4,893,988 A | 1/1990 | Sato | |
| 5,096,380 A * | 3/1992 | Byrnes | B64C 27/33 416/134 A |
| 5,263,821 A * | 11/1993 | Noehren | B64C 27/33 415/115 |
| 6,126,398 A * | 10/2000 | Bauer | B64C 27/51 416/134 A |
| 6,196,800 B1 * | 3/2001 | Bauer | B64C 27/33 416/107 |
| 6,695,253 B1 * | 2/2004 | Romani | B64C 27/50 244/17.11 |
| 2004/0026564 A1 * | 2/2004 | Romani | B64C 27/50 244/17.11 |
| 2008/0101934 A1 * | 5/2008 | Stamps | B64C 27/48 416/134 A |

\* cited by examiner

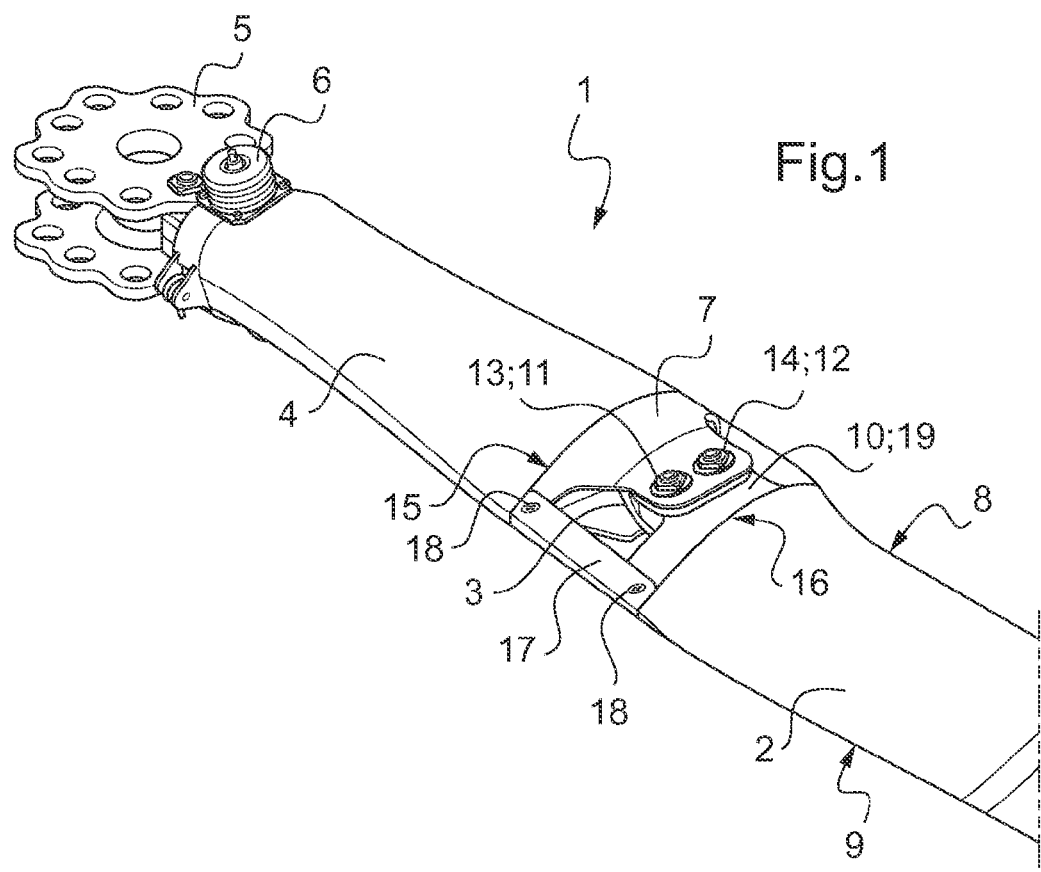
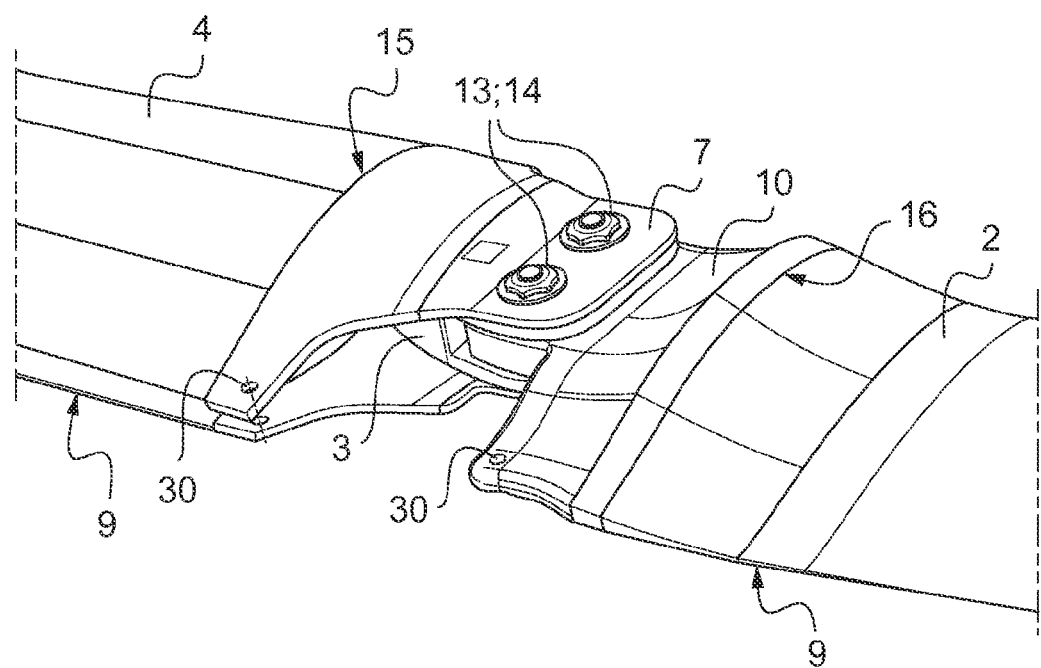

SEPARABLE BLADE ATTACHMENT FOR A BEARINGLESS ROTOR OF A HELICOPTER

CROSS REFERENCE TO RELATED APPLICATIONS

This application claims priority to European patent application No. 12 400042.3 filed Oct. 18, 2012, the disclosure of which is incorporated in its entirety by reference herein.

BACKGROUND OF THE INVENTION (1) Field of the Invention

The invention relates to a separable blade attachment for a bearingless rotor of a helicopter, including a lift-generating airfoil blade, a flexbeam enclosed by a control cuff or torque tube, and connection means forming a separable or releasable junction between the airfoil blade and the flexbeam and the control cuff. The flexbeam and the control cuff can be connected or not.

(2) Description of Related Art

During operation, the rotor blades are deflected in various directions and are thereby subjected to high loads in these various directions. The rotor blades must be designed to withstand these high loads while still providing the required flexibility or articulation to allow the blades to carry out flapping, lead-lag oscillating, and pitch angle variation movements.

Typically, a rotor blade of a bearingless rotor includes a structural element known as a flexbeam at the inner end of the blade connected to the rotor head. The flexbeam supports and transmits the centrifugal forces of the blade into the rotor head. Additionally, the flexbeam includes at least portions or regions that are flexurally and torsionally soft or flexible to allow the blade to undergo the above mentioned movements in a flapping direction, a lead-lag direction, and in a pitch angle direction. The torsionally soft portion of the flexbeam is arranged within a torsionally stiff control cuff or torque tube, through which the pitch angle control movements are transmitted to the lift-generating airfoil blade portion of the rotor blade. The airfoil blade typically extends from the outboard end of the control cuff to the outermost end of the rotor blade, i.e. the blade tip.

The vibrations of the rotor blades, and particularly the oscillations in the lead-lag direction, must be damped by appropriate damping elements. The damping effectiveness of the damping elements is predominantly dependent on the effective transmission of the lead-lag oscillating movements of the airfoil blade into the damping elements. Any softness or lack of force transmission through the blade/cuff attachment to the damping element will reduce the total resulting damping effect.

In order to allow the flexbeam/cuff unit and/or the airfoil blade to be separately manufactured and/or replaced in the event of damage, or in order to allow the airfoil blade to be pivoted and folded relative to the flexbeam/cuff unit, it is desired to provide a separable or releasable junction between the flexbeam/cuff unit and the lift-generating airfoil blade.

The separable or releasable junction is subject to high technical and mechanical demands, because it must reliably carry and transmit the substantially high centrifugal forces resulting during rotation of the rotor blade and all bending moments from flapping and lead lag movements of the rotor blade. The rotor blade has a longitudinal main load axis next to 25% of the average airfoil chord of the blade profile, said main load axis being essentially covered by the pitch axis of said rotor blade. At the level of the flexbeam said longitudinal main load axis next to 25% of the average airfoil chord of the blade profile corresponds to a longitudinal middle axis of the flexbeam.

The document US2008101934 A1 discloses an assembly for providing flexure to a blade of a rotary blade system including an upper support plate having an upper curved surface, a lower support plate having a lower curved surface, and a yoke positioned there between. An embodiment includes an assembly for providing flexure to a blade of a rotary blade system, including, an upper support plate having an upper curved surface, a lower support plate having a lower curved surface, and a yoke positioned there between and directly contacting the support plates wherein one of the curved surfaces is a non-circular arc that does not form part of the circumference of a circle.

The document EP 0 315 962 A2 discloses a helicopter rotor blade supported by a flexbeam to be rotatable about an axis of rotation, in which a pitching motion thereof is allowable. The rotor blade is provided with a device for changing the pitch and damping the lead-lag motion thereof. The device comprises a bushing in a hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the pitch sleeves has both ends outwardly projecting beyond the elastomeric dampers and secured to a pitch sleeve which encloses the flexbeam. Therefore, the relative position between the pitch sleeve and the elastomeric pivot does not change even when lead-lag motion is imparted to the rotor blade.

The document U.S. Pat. No. 4,427,340 A discloses helicopter rotors and more particularly rotor mounting involving a composite fiber-reinforced unitary yoke with resilient inplane restraints.

The document U.S. Pat. No. 6,126,398 A discloses a rotor blade for a bearingless rotor of a helicopter with a lift-generating airfoil blade, a flexbeam connecting the airfoil blade to a rotor head, and a control cuff enclosing the flexbeam. The junction between the flexbeam and the airfoil blade is a separable junction to allow the airfoil blade to be folded in a simple manner while maintaining a high lead-lag stiffness and reduced structural height of the junction. The junction is formed by two connection arms arranged side-by-side in the lead-lag plane of the rotor blade.

BRIEF SUMMARY OF THE INVENTION

It is an object of the invention to provide an improved configuration of a separable blade attachment for a bearingless rotor of a helicopter and particularly to provide a separable or releasable junction between an airfoil blade and a flexbeam/cuff unit to allow further improvement of the lead-lag movement transfer from the rotor blade to the dampers, improve drag behavior and operability. It is a further object of the invention to provide an especially efficient junction arrangement for a separable blade attachment.

The above objects are provided with a separable blade attachment for a bearingless rotor of a helicopter with the features of claim 1 of the invention. Preferred embodiments of the invention are presented in the subclaims.

According to the invention a separable blade attachment for a bearingless main rotor of a helicopter comprises an airfoil blade having a tip end and a root end forming opposite ends thereof. Said airfoil blade has a pitch axis from said tip end to said root end. The separable blade attachment further comprises a flexbeam including an attachment end of the flexbeam. Said flexbeam is flexible so as to allow lead-lag movements, flapping movements and pitch movements of said airfoil blade relative to a rotor head of the bearingless main rotor of the helicopter.

The separable blade attachment still further comprises a control cuff enclosing and extending along at least a predominant portion of said flexbeam. A separable junction arrangement provides a separable connection between said attachment end of the flexbeam with said control cuff at one side and said root end of said airfoil blade at the other side. Said junction arrangement is mechanical between said attachment end of the flexbeam, said control cuff and/or said root end of said airfoil blade with removable fasteners respectively removable connecting said root end of said airfoil blade and said control cuff with said attachment end of the flexbeam. Said removable fasteners comprise at least one bolt.

A stiffened link is provided between respective trailing edges of the control cuff and said airfoil blade, said stiffened link being mounted to the control cuff and said airfoil blade along their respective trailing edges by the removable fasteners. Said stiffened link is push-pull stiff with regard to loads aligned with the trailing edge. Particularly according to the invention, the in chord direction of the airfoil blade maximized distance of said stiffened link from the at least one bolt provides for a non-dissipative transmission of the lead lag moments from the airfoil blade across the separable connection and said lead lag stiff control cuff to a lead lag damper at an interface of said control cuff with the rotor head.

According to the invention, the separable blade attachment includes at least one bolt arranged lying perpendicular to the lead-lag pivoting plane of the rotor blade. In this context, the lead-lag pivoting plane essentially corresponds to the rotation plane of the rotor blade. The inventive blade attachment achieves the advantage that the lead-lag pivoting stiffness at the separable or releasable junction is substantially increased by the maximized distance in chord direction of the airfoil blade between said at least one bolt and said stiffened link aligned with the blade trailing edge and the cuff trailing edge of said airfoil blade. Said at least one bolt and said stiffened link configuration allow an integration of the inventive blade attachment more easily than the arrangement of a plurality of equally charged bolts provided with any of the prior art arrangements. Said at least one bolt is located nearby the maximum thickness of the profile of the blade attachment approximately in line with the pitch axis of the airfoil blade.

The invention allows a reduced total structural height at an extended width of the profile of the inventive separable blade attachment while improving the mechanical strength of the junction. The inventive separable blade attachment allows configuration of the control cuff with a reduced profile height at the root end of said airfoil blade and therewith provides an improved overall aerodynamic configuration without any perturbing slits in the exterior profile and/or any projecting bolts of the control cuff and/or at the root end of said airfoil blade.

The junction arrangement of the invention with the large distance in chord direction of said airfoil blade between said at least one bolt and said stiffened link takes up and transmits the lead-lag moments so as to achieve a transfer from the airfoil blade into the lead-lag stiff control cuff, allowing improved efficiency of the lead-lag dampers arranged next to the control cuff/rotor head junction subsequently allowing less complex lead-lag dampers with reduced weight, smaller size and lower costs at fabrication and/or for maintenance during operation.

The inventive blade attachment is provided with holes for the at least one bolt and said stiffened link. The airfoil blade, the flexbeam and the control cuff of the invention are separately fabricated and the flexbeam with the junction arrangement can be slit into the completed control cuff for simple and fast mounting. The airfoil blade is attached to the flexbeam/cuff unit by the at least one bolt and said stiffened link. With the inventive blade attachment it is possible to pivot the lift-generating airfoil blade relative to the flexbeam and the control cuff in the lead-lag plane for the purpose of folding the blade into a folded configuration in a quick and simple manner. Namely, it is simply possible to remove said stiffened link of the inventive separable blade attachment, in order to allow the airfoil blade to be pivoted about one bolt remaining in the junction arrangement to achieve the desired blade folding. With the inventive separable blade attachment an easy folding of the airfoil blades in forward and rearward direction is possible.

According to a preferred embodiment of the invention said removable fasteners comprise two bolts arranged in the area of a 10-30% chordwise axis of a profile section of said airfoil blade, preferably symmetrical with regard to the pitch axis. With said inventive arrangement the bolts carry most of the centrifugal load while said stiffened link carries almost all of the lead-lag loads.

According to a further preferred embodiment of the invention said stiffened link is aerodynamically adapted to the respective trailing edges of the control cuff and said airfoil blade for reduced drag.

According to a further preferred embodiment of the invention a fairing is provided, said fairing being adapted to be mounted aerodynamically smooth along a leading edge from a profile edge of the control cuff till an airfoil edge of the airfoil blade. Said fairing is adapted for clipping to the root end of the airfoil blade and the attachment end of the flexbeam along the profile edge of the control cuff and the airfoil edge of the airfoil blade. Said fairing is aerodynamically fitted to the stiffened link. The fairing sheathes a gap at the junction between control cuff and said airfoil blade, said gap between the profile edge and the airfoil edge being created by said projecting attachment end of the flexbeam and said projecting root end of said airfoil blade for reduced drag.

According to a further preferred embodiment of the invention said at least one bolt together with any fasteners are integrated aerodynamically into said junction arrangement.

According to a further preferred embodiment of the invention said attachment end of the flexbeam is fork shaped to accommodate said at least one bolt. The airfoil blade is slit into the fork shaped attachment end of the flexbeam and the control cuff surrounds the fork shaped attachment end of the flexbeam.

According to a further preferred embodiment of the invention said attachment end of the flexbeam is prepared for reception of one bolt for connecting said attachment end of the flexbeam to said root end of said airfoil blade. Said trailing edge of the control cuff is prepared for reception of the at least one fastener for connecting said stiffened link to said trailing edge of said control cuff and said trailing edge of said root end of said airfoil blade is prepared for reception of at least one further fastener for connecting said stiffened link to said trailing edge of said root end of said airfoil blade. Flexbeam and control cuff are preferably mounted mechanically fix to each other for an even better transmission of loads.

According to a further preferred embodiment of the invention said root end of said airfoil blade is fork shaped, said attachment end of the flexbeam has a flat stepped cross section and said root end of said airfoil blade is arranged in slits between said control cuff and said attachment end of the flexbeam.

According to a further preferred embodiment of the invention said control cuff is formed with a leading slit and a trailing slit adjacent to said flexbeam head to allow forward and rearward folding of the airfoil blade relative to the flexbeam by means of one remaining bolt in the junction arrangement after removal of the stiffened link.

BRIEF DESCRIPTION OF THE DRAWINGS

In order that the invention may be clearly understood it will now be described in connection with preferred example embodiments, with reference to the accompanying drawings, wherein:

FIG. 1 is a perspective view of a rotor with a breakdown of the main components of a separable blade attachment according to the invention;

FIG. 2 is a perspective view of the partly assembled separable blade attachment according to the invention;

DETAILED DESCRIPTION OF THE INVENTION

Figure 3:
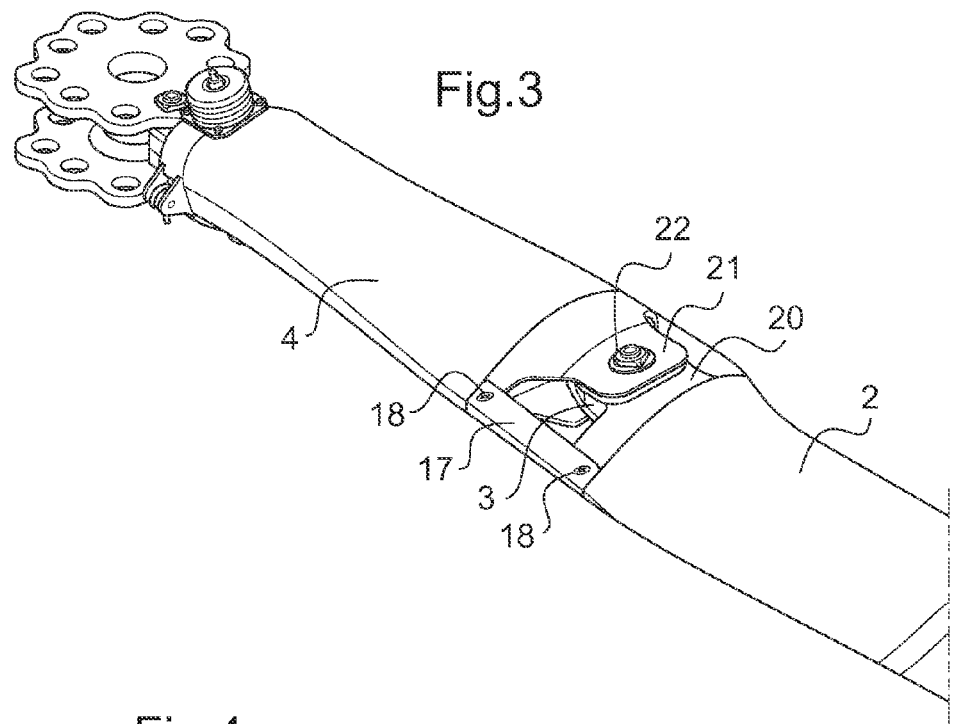
FIG. 3 is a perspective view of an alternative separable blade attachment according to the invention.

According to FIG. 1 a blade attachment 1 for a bearingless rotor of a helicopter (not shown) comprises an airfoil blade 2 made of a fiber-reinforced composite material, a flexbeam 3 and a torsion stiff and lead lag stiff control cuff or torque tube 4 enclosing the flexbeam 3. The airfoil blade 2 is mounted by means of the flexbeam 3 and the control cuff 4 to a rotor head 5. A lead lag damper 6 is arranged at an interface of the control cuff 4 with the rotor head 5.

In operation each of the airfoil blades 2 rotate about an essentially vertical rotor head axis, whereby the airfoil blades 2 rotate with their lengthwise central axis in a rotor blade plane. This rotor blade plane substantially corresponds to the lead-lag pivoting or oscillating plane of the airfoil blades 2 of the bearingless rotor of the helicopter.

The flexbeam 3 and the control cuff 4 are respectively made of a fiber-reinforced composite material. A rotor end (not shown) of the flexbeam 3 is secured to the rotor head 5 of the helicopter (not shown). An attachment end 7 of the flexbeam 3 extends with the control cuff 4 towards the airfoil blade 2.

The airfoil blade 2 and the control cuff 4 have a leading edge 8 and a trailing edge 9. The airfoil blade 2 has a tip end (not shown) and a root end 10, said root end 10 of the airfoil blade 2 projecting from the aerodynamically profiled airfoil blade 2 towards the control cuff 4. The airfoil blade 2 has a longitudinal pitch axis (not shown) between said tip end and said root end 10, said pitch axis being next to 25% of the chord of the airfoil blade 2.

The root end 10 of the airfoil blade 2, the attachment end 7 of the flexbeam 3 and the control cuff 4 each have two matching holes 11, 12 for two bolts 13, 14, namely two bolts 13, 14 being approximately symmetric with regard to the pitch axis of the airfoil blade 2. The two matching holes 11, 12 with the two bolts 13, 14 are oriented essentially rectangular with regard to a middle plane through the leading edge 8 and the trailing edge 9 of the airfoil blade 2.

The two bolts 13, 14 mechanically connect the airfoil blade 2 with the flexbeam 3 and the control cuff 4 at the junction arrangement of the separable blade attachment 1. The flexbeam 3 with the attachment end 7 is covered by the control cuff 4. The two bolts 13, 14 transmit the centrifugal forces and flapping moments between the airfoil blade 2 and the flexbeam 3 and the control cuff 4.

A profile edge 15 of the control cuff 4 extends from the leading edge 7 to the trailing edge 8 transverse to the longitudinal pitch axis and an airfoil edge 16 extends from the leading edge 7 to the trailing edge 8 transverse to the longitudinal pitch axis of the airfoil blade 2. The profile edge 15 of the control cuff 4 and the airfoil edge 16 of the airfoil blade 2 of the junction arrangement are fixed distant to each other, said distance being defined by the root end 10 projecting from the airfoil blade 2 and the attachment end 7 projecting from the flexbeam 3.

A stiffened link 17 is mounted along the trailing edge 8 from the profile edge 15 of the control cuff 4 till the airfoil edge 16 of the airfoil blade 2. The stiffened link 17 is adapted for fixation to the root end 10 of the airfoil blade 2 and to the control cuff 4 next to the respective trailing edge 8. The stiffened link 17 is adapted for aerodynamic smooth fit along the profile edge 15 of the control cuff 4 and the airfoil edge 16 of the airfoil blade 2. The stiffened link 17 is fixed to the root end 10 of the airfoil blade 2 and to the control cuff 4 by means of fasteners 18 through corresponding borings in the stiffened link 17 after shifting the stiffened link 17 transversal to the trailing edge 9 onto the root end 10 and the control cuff 4.

The stiffened link 17 is designed to withstand push-pull loads. The two bolts 13, 14 and the stiffened link 17 transmit the lead lag moments from the airfoil blade 2 to the control cuff 4. The stiffened link 17 is made of a fiber-reinforced composite material.

A fairing 19 is adapted to be mounted aerodynamically smooth along the leading edge 8 from the profile edge 15 of the control cuff 4 till the airfoil edge 16 of the airfoil blade 2. The fairing 19 is adapted for clipping to the root end 10 of the airfoil blade 2 and the attachment end 7 of the flexbeam 3 along the profile edge 15 of the control cuff 4 and the airfoil edge 16 of the airfoil blade 2. The fairing 19 is aerodynamically fitted to the stiffened link 17. The fairing 19 does not carry any loads from the control cuff 4 or the airfoil blade 2 apart from retaining and aerodynamic loads. The fairing 19 is made of a fiber-reinforced composite material. The fairing 19 is mounted from the leading edge 8 by clipping to the respective upside and downside of the root end 10 of the airfoil blade 2 and the attachment end 7 of the flexbeam 3 along the profile edge 15 of the control cuff 4 and the airfoil edge 16 of the airfoil blade 2 till contact to the stiffened link 17.

According to FIG. 2 corresponding features are referred to with the references of FIG. 1. The root end 10 of the airfoil blade 2 and the control cuff 4 are each provided with borings 30 next to the respective trailing edges 9 of the control cuff 4 and the airfoil blade 2. The borings 30 of the control cuff 4 are next to the profile edge 15 of the control cuff 4. The borings 30 are oriented essentially in line with the two bolts 13, 14 for mounting the attachment end 7 of the flexbeam 3 with the control cuff 4 to the airfoil blade 2.

According to FIG. 3 corresponding features are referred to with the references of FIG. 1, 2. An airfoil root end 20 of the airfoil blade 2, the control cuff 4 and a flexbeam attachment end 21 are mechanically connected by a single bolt 22. The stiffened link 17 is fixed to the airfoil root end 20 of the airfoil blade 2 and to the control cuff 4 by means of fasteners 18.

Figure 4:
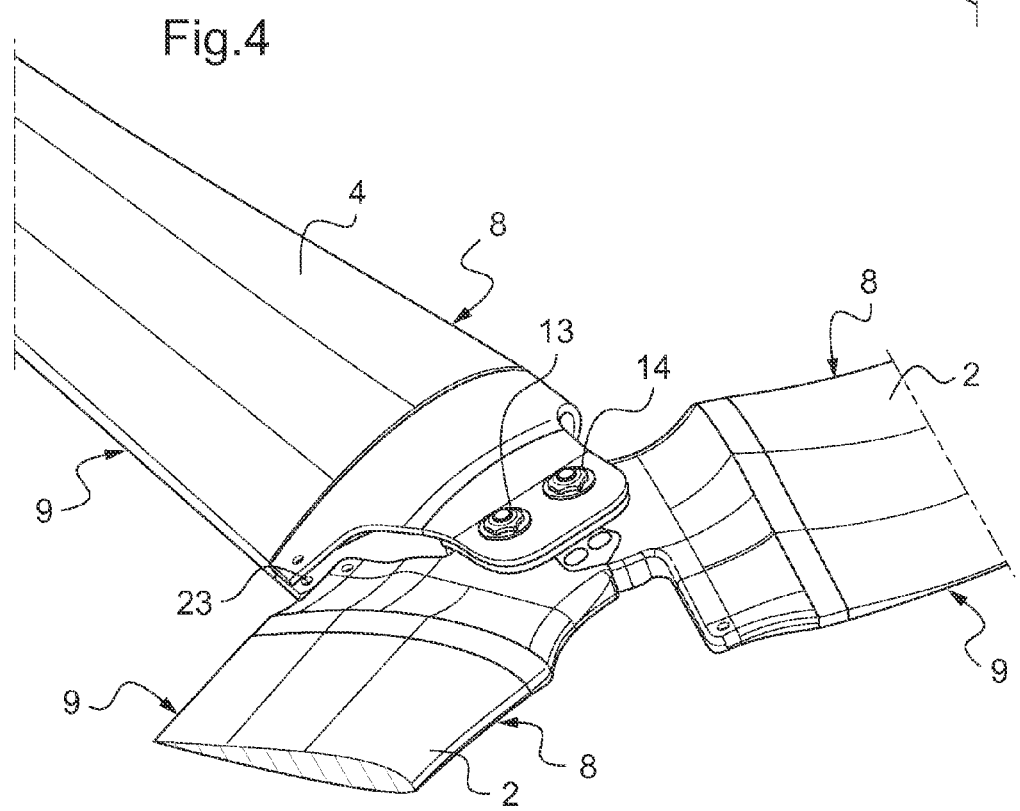
FIG. 4 is a perspective view of the separable blade attachment with an airfoil blade folded forward and rearward according to the invention.

According to FIG. 4 corresponding features are referred to with the references of FIGS. 1-3. The control cuff 4 is provided with a leading slit (not shown) next to the attachment end 7 of the flexbeam 3 and next to its leading edge 8. The control cuff 4 is as well provided with a trailing slit 23 next to the attachment end 7 of the flexbeam 3 and next to its trailing edge 8.

After removal of one of the two bolts 13, 14 and after removal of the fasteners 18 from the borings 30 and the stiffened link 17 the airfoil blade 2 can be folded relative to the flexbeam 3. The leading slit is designed to accommodate the leading edge 8 and the trailing slit 23 is designed to accommodate the trailing edge 9 of the airfoil blade 2 for respectively maximized folding angles of the airfoil blade 2. Airfoil blade 2 is shown in a forward and in a rearward folded position.

REFERENCE LIST 1 blade attachment
2 airfoil blade
3 flexbeam
4 control cuff
5 rotor head
6 lead lag damper
7 attachment end
8 leading edge
9 trailing edge
10 root end
11 hole
12 hole
13 bolt
14 bolt
15 profile edge
16 airfoil edge
17 stiffened link
18 fastener
19 fairing
20 airfoil root end
21 flexbeam attachment end
22 single bolt
23 trailing slit

What is claimed is:

1. A separable blade attachment for a bearingless rotor of a helicopter, comprising:
an airfoil blade with a tip end and a root end forming opposite ends thereof;
a flexbeam with an attachment end, the flexbeam being flexible;
a torsion stiff and lead lag stiff control cuff enclosing at least a predominant portion of the flexbeam;
a separable junction arrangement between the attachment end of the flexbeam, the control cuff and the root end of the airfoil blade, wherein the junction arrangement is mechanical between the attachment end of the flexbeam, the control cuff, and the root end of the airfoil blade, with removable fasteners respectively removably connecting the root end of the airfoil blade and the control cuff with the attachment end of the flexbeam, the removable fasteners comprising at least one bolt and wherein a stiffened link is provided between respective trailing edges of the control cuff and the airfoil blade, the stiffened link being mounted to the respective trailing edges of the control cuff and the airfoil blade by the removable fasteners and the stiffened link being push-pull stiff with regard to loads aligned with the trailing edge.

2. The separable blade attachment according to claim 1, wherein the removable fasteners comprise two bolts.

3. The separable blade attachment according to claim 1, wherein the stiffened link is aerodynamically adapted to the respective trailing edges of the control cuff and the airfoil blade.

4. The separable blade attachment according to claim 1, wherein a fairing is provided, the fairing being adapted to be mounted aerodynamically smooth along the leading edge from a profile edge of the control cuff till an airfoil edge of the airfoil blade, the fairing being adapted for clipping to the root end of the airfoil blade and the attachment end along the profile edge of the control cuff and the airfoil edge of the airfoil blade, and the fairing being aerodynamically fitted to the stiffened link.

5. The separable blade attachment according to claim 1, wherein the at least one bolt together with any fasteners are integrated aerodynamically into the junction arrangement.

6. The separable blade attachment according to claim 1, wherein the attachment end of the flexbeam is fork shaped to accommodate the root end of the airfoil blade.

7. The separable blade attachment according to claim 1, wherein the control cuff is mechanically connected to the flexbeam.

8. The separable blade attachment according to claim 1, wherein the attachment end of the flexbeam is configured for reception of the at least one bolt for connecting the attachment end of the flexbeam to the root end of the airfoil blade, and the control cuff is configured for reception of the at least one of the fasteners for connecting the stiffened link to the respective trailing edges of the control cuff and the root end of the airfoil blade is configured for reception of at least another one of the fasteners for connecting the stiffened link to the trailing edge of the root end of the airfoil blade.

9. The separable blade attachment according to claim 1, wherein the root end of the airfoil blade is fork shaped, the attachment end of the flexbeam has a flat stepped cross section and the root end of the airfoil blade is arranged in between the control cuff and the attachment end of the flexbeam.

10. The separable blade attachment according to claim 1, wherein the control cuff is formed with a leading slit and a trailing slit adjacent to the attachment end of the flexbeam.

11. The separable blade attachment according to claim 1, wherein the control cuff is mechanically connected to the flexbeam by at least one of adhesive, rivets, or screws.

* * * * *